Jan. 23, 1968 R. NETSCH 3,365,355
TETRAFLUOROETHYLENE POLYMER ARTICLES HAVING
ONE READILY CEMENTABLE SURFACE
CONTAINING GLASS PARTICLES
Filed April 29, 1964

INVENTOR.
RAYMOND NETSCH
BY Stanley Litz
ATTORNEY.

3,365,355
TETRAFLUOROETHYLENE POLYMER ARTICLES HAVING ONE READILY CEMENTABLE SURFACE CONTAINING GLASS PARTICLES
Raymond Netsch, North Wales, Pa., assignor to Pennsalt Chemicals Corporation, Philadelphia, Pa., a corporation of Pennsylvania
Filed Apr. 29, 1964, Ser. No. 363,627
7 Claims. (Cl. 161—185)

ABSTRACT OF THE DISCLOSURE

Tetrafluoroethylene polymer articles are provided having at least one surface comprised of tetrafluoroethylene polymer containing 15–70% by weight of glass particles and at least one surface formed of unfilled polymer, whereby the glass-filled surface is easily cemented to a substrate using a conventional adhesive.

---

Figure 1:

This invention relates to novel objects comprising polytetrafluoroethylene (PTFE) resins which have the advantage of being cementable to other objects, and in particular relates to PTFE-containing objects which have one or more of their surfaces formed from a mixture of PTFE polymer with particles of glass, and one or more of their other surfaces formed entirely from unfilled PTFE-containing polymeric material.

The difficulties involved in cementing PTFE articles are well known and are illustrated by Example 7. A number of methods have been suggested for making polytetrafluoroethylene-containing polymer cementable, including treating of its surface of PTFE-containing objects with a dispersion of sodium metal to modify the surface as in U.S. Patent 2,789,063, and also by treating such surfaces with a coat dispersion of colloidals $SiO_2$ and PTFE colloidal dispersion with heating, as in British Patent 866,417. While these methods have met with some degree of success, the sodium modification is an involved process which has been found to give a bond susceptible to weathering and the colloidal silica treatment has been found to produce bonds of low peel strength.

The present invention permits the formation of high strength bonds without subsequent surface treatment after the sheet is fabricated, and allows fabricators to make cementable PTFE sheets approximately as readily as normal unmodified PTFE sheets are now manufactured.

These new sheets and other objects of PTFE enjoy all the remarkable corrosion resistant and other physical and chemical properties of the unmodified exposed surfaces.

The present invention involves objects comprised of polymeric materials comprising at least 50 mole percent PTFE and having at least one filled surface which is formed of a mixture of the polymeric materials filled with glass, preferably with at least 25 weight percent of fine glass particles. The new manufactures of the present invention also have at least one unfilled surface formed entirely of the polymeric materials without the addition of glass filler. The glass filled surfaces of the new articles of manufacture are cementable by the use of epoxy and other common adhesives.

The PTFE used in the practice of the present invention is any of the commonly available PTFE molding powders and preferably the very fine particle size molding power commercially known as Teflon 7, or as ASTM Type IV. The process of manufacture of the preferred PTFE molding powder is described in U.S. Patent 2,936,301.

The glass for use in the present invention should be in the form of fine particles and is preferably manufactured by milling fiber glass. Various grades of milled glass are commercially available. The preferred material is milled one-sixteenth to one sixty-fourth inch diameter fiber glass, such as that produced by Owens-Corning Fiberglas Corp. and sold under the trade name 709 Milled Fibers $\frac{1}{32}''$.

In a preferred embodiment of the invention, a mixture of glass and Teflon 7 Type IV molding powder is prepared by tumbling of dry blending the approximately equal quantities of the two materials, preferably on a roller mill or similar apparatus. The mixture is then preferably screened directly into the mold. The mixture can be pressed slightly to level and form an even surface, or be levelled by vibration of the mold or by other means. Unfilled Teflon 7 powder is then screened into the mold on top of the first fill until the desired working depth is reached. The charge is then levelled and covered with the upper portion of the mold or with a sheet of 2 to 3 mill aluminum foil followed by one-eighth inch thick elastic distribution sheet and finally by a pressure plate. Pressure is built up to about 2000 p.s.i. to give a preform. The preform is then sintered according to conventional methods for from about 15 minutes to about 6 hours, depending on the thickness and shape of the object being formed. After cooling, a laminated sheet or a laminated object is produced which can be directly cemented on its glass filled side to surfaces of metal, other glass filled PTFE, or many other materials, including wood and other plastics.

Figure 2:
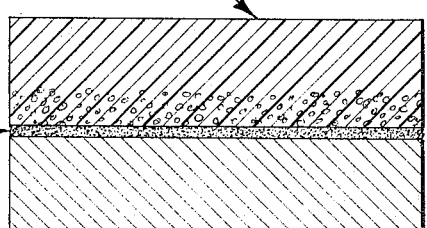

Illustrative embodiments of the easily-cementable PTFE articles embodied in this invention are depicted in the accompanying drawing wherein FIGURE 1 shows a PTFE sheet wherein one surface is a PTFE composition modified by having glass particles dispersed therein, and the other surface of the PTFE sheet is composed of unfilled PTFE. FIGURE 2 depicts the sheet represented by FIGURE 1 cemented to a substrate material by means of an adhesive layer joining the substrate to the surface of the PTFE sheet containing the glass particles.

The percentage of glass in the filled portions of the objects of the invention should be from about 15% to about 70% by weight, with the ranges from 25% to about 65% being preferred and from 35% to 60% being most preferred.

By glass is meant water insoluble, inorganic glass compositions which in general are suitable for the practice of the present invention. Silica glass, that is, glasses made primarily from silica, are preferred. The common lime soda type of silica glass is most preferred.

In place of the Teflon 7 molding powder described in the above preferred embodiment, a mixture or copolymer containing at least 50 mol percent PTFE admixed or copolymerized with other polymeric materials including polyvinylidenefluoride, polychlorotrifluoroethylene and more common polymers, including arcylics, methacrylates, etc. may be substituted.

Many commercially available adhesives will be found useful with the present invention, but those most preferred because of their high strengths and good handling properties are the epoxy and synthetic rubber based types. The bonds are preferably formed according to the adhesive manufacturer's directions.

In some instances it will be preferable to first form a semi-preform by compressing the glass-filled material into a mold at a pressure lower than the conventional preform pressure for the molding powder. The weak, semi-preform thus made can then be transferred to a larger mold, the cavity filled with unfilled molding powder, compressed to normal preform pressure and then conventionally sintered. This technique is useful for preparation of complex shapes such as bushings, insulators, etc. which have one or more cementable surfaces attached integrally to the unfilled portions of the object.

EXAMPLE 1

*Preparation of laminated PTFE sheet according to the present invention*

An intimate mixture of glass (milled one-thirty-second inch diameter fiber glass obtained from Owens-Corning Fiberglas Corp. of Huntingdon, Pa., under the name 709 Milled Fibers 1/32") and Teflon 7 molding powder is prepared by tumbling the two materials in equal quantities by weight on a two (2) inch diameter roller mill in a 10" diameter 5-gallon can for approximately one-half hour. This mixture is then screened into a 4 x 5" sheet mold through a 20 mesh sieve with care being taken to uniformly cover the bottom plate of the mold. Unfilled Teflon 7 molding powder is then screened into the mold on top of the first fill to the desired working depth. The level charge is then covered, first with an approximately 2 mill thick layer of aluminum foil, then with 1/8" thick rubber distribution sheet and finally with a top plate. Pressure is applied at approximately 2000 p.s.i. to yield a preform. The preform is then sintered for about 1 hour at 380° C. After cooling, the molded sheet is examined and found to be a laminate having a glass filled surface and another surface composed of 100% PTFE.

EXAMPLE 2

*Testing of sheet formed in Example 1*

A one-inch strip of the sheet formed in Example 1 is glued to a one-inch wide steel surface using Therma-Blend epoxy cement according to the manufacturer's directions. (Therma-Blend epoxy cement is manufactured by Plastic Associates and is distributed by the Fluorcarbon Company of Anaheim, Calif.)

The peel strength of the resulting bond is measured by pulling apart the bond at right angles on the Instron Tensile Testing Machine at 2"/min., and is found to be 15.6 pounds per inch. The cemented bond is not the point of failure and remains intact during the peel strength test. The backing fails at the 15.6 pounds per inch value.

EXAMPLE 3

When the preparation of Example 1 is repeated using 8.0 grams of a glass filled composition (50% by weight of glass/50% by weight PTFE) together with 37.3 grams of unfilled Teflon 7 PTFE powder, a somewhat thinner laminated sheet is produced. When this sheet is cemented to a surface of steel according to the methods outlined in Example 2, the surface fails at 10.6 pounds per inch, but the cemented bond remains intact.

EXAMPLE 4

When the process of Example 3 is repeated using 50/50% by weight glass PTFE mixture in the amount of 16.4 grams together with 27 grams of unified Teflon 7 PTFE powder, a still thinner sheet is obtained. This sheet fails at 9.2 pounds per inch but the cemented bond again remains intact.

EXAMPLE 5

When 20 grams of 25% glass/75% by weight PTFE resin are used in conjunction with 30 grams of unfilled Teflon 7 PTFE powder according to the methods of Example 1, a Therma-Blend epoxy cement bond fails at 8.4 pounds per inch. The failure is in the bond itself.

EXAMPLE 6

When 9.0 grams of a 75% glass/25% PTFE mixture are used in conjunction with 35 grams of 100% Teflon 7 PTFE Teflon powder, the laminated sheet thus formed lacks cohesive strength at the glass-PTFE surface and peel strength cannot be determined.

EXAMPLE 7

When approximately 50 grams of 100% Teflon 7 PTFE powder are used, the Therma-Blend bond prepared as in Example 2 has no measurable adhesive strength.

EXAMPLE 8

A laminated sheet prepared according to the methods of Example 1 using 8 g. of 50% glass/50% PTFE and 37.3 grams of unfilled Teflon 7 PTFE powder when bonded with Garlock 201 according to the manufacturer's directions gave a peel strength of 16.2 pounds per inch. Garlock 201 is a two component type adhesive manufactured by the Garlock Company of Camden, N.J. The PTFE sheet was bonded to steel strips as previously. The rupture occurs in the backing material and the bond remains intact.

EXAMPLE 9

When 8.5 grams of a 50% glass/50% by weight PTFE resin are molded together with 45 grams of 100% Teflon 7 PTFE molding powder, the resulting laminated sheet when bonded with Epoxylite 5403 to a steel surface, gives a peel strength of 19.0 pounds per inch. (Epoxylite 5403 is an epoxy adhesive manufactured by The Epoxylite Corp. of South Elmonte, Calif. and is more fully described in their Bulletin TB #5403.) The rupture occurs in the backing material itself and the bond remains intact.

EXAMPLE 10

When 15 grams of 37.5 percent glass/62.5% by weight PTFE are laminated with 45 grams of unfilled Teflon 7 polytetrafluoroethylene molding powder according to the method of Example 1, the peel strength of the resulting laminated sheet is 22.4 pounds per inch when cemented to steel with E.C. 1300 synthetic rubber base cement. (E.C. 1300 synthetic rubber base cement is an unvulcanized synthetic rubber type cement produced by Minnesota Mining and Manufacturing Company of Minneapolis, Minn., and more fully described in their technical data sheet "3M Adhesive E.C. 1300 Issue #6".) The failure is noted to occur in the laminated sheet itself and the bond remains intact even at this high stress.

It should be understood that the present invention is susceptible to a wide range of variations and modifications, all of which are within the scope of the invention and that the preceding examples are merely illustrative of the invention and are to be taken to restrict it in no manner and to no degree.

I claim:

1. An object formed of polymeric materials comprising at least 50 mol percent polytetrafluoroethylene said object having at least one filled surface formed of a mixture of said polymeric materials filled with about 15% to 70% by weight of glass particles and at least one unfilled surface formed entirely of said polymeric materials, said filled surface being cementable to other objects by means of an adhesive without the need of further chemical or physical modification of said filled surface prior to the addition of the adhesive thereto.

2. The object of claim 1 wherein the materials forming the filled surface are filled with from 25 to 65% by weight of glass particles.

3. The object of claim 2 wherein the polymeric materials comprise approximately 100% polytetrafluoroethylene.

4. The object of claim 2 wherein the glass particles are formed by grinding fiber glass having a diameter of from one-sixteenth to one-sixty-fourth inch, and the polymeric material is contributed by ASTM Type IV polytetrafluoroethylene molding powder.

5. An article of manufacture comprising an object of claim 2 bonded to a metal surface by an adhesive selected from the group consisting of synthetic rubber base adhesive and epoxy adhesives.

6. The article of claim 5 wherein the adhesive is a synthetic rubber base adhesive.

7. The article of claim 5 wherein the adhesive is an epoxy base adhesive.

(References on following page)

References Cited

UNITED STATES PATENTS

| | | | | |
|---|---|---|---|---|
| 2,427,183 | 9/1947 | Berry | | 161—189 |
| 2,809,130 | 10/1957 | Rappaport | | 161—189 X |
| 3,067,078 | 12/1962 | Gluck | | 161—119 |
| 3,067,135 | 12/1962 | Strub | | 252—12 |
| 3,198,691 | 8/1965 | Thomas et al. | | 161—189 X |
| 2,728,698 | 12/1955 | Rudner | | 161—189 X |

EARL M. BERGERT, *Primary Examiner.*

HAROLD ANSHER, *Examiner.*